US006237883B1

(12) United States Patent
Levin et al.

(10) Patent No.: US 6,237,883 B1
(45) Date of Patent: May 29, 2001

(54) SIGN BRACKET FOR SIGN STAND

(75) Inventors: Yevgeniy M. Levin; David U. Hillstrom, both of Novi, MI (US)

(73) Assignee: Marketing Displays International, Farmington Hills, MI (US)

( * ) Notice: Subject to any disclaimer, the term of this patent is extended or adjusted under 35 U.S.C. 154(b) by 0 days.

(21) Appl. No.: 09/506,969

(22) Filed: Feb. 18, 2000

(51) Int. Cl.[7] .......... F16M 11/00

(52) U.S. Cl. .......... 248/176.1; 40/607; 40/612

(58) Field of Search .......... 248/176.1, 188.5, 248/160; 40/606, 607, 612; 403/326, 327, 329

(56) References Cited

U.S. PATENT DOCUMENTS

| | | | | |
|---|---|---|---|---|
| 4,433,935 | * | 2/1984 | Main et al. | 403/385 |
| 4,490,934 | * | 1/1985 | Knapp | 40/603 |
| 4,507,887 | | 4/1985 | Seely | 40/606 |
| 4,544,125 | * | 10/1985 | Seely | 248/624 |
| 4,548,379 | * | 10/1985 | Seely et al. | 248/624 |
| 4,569,499 | | 2/1986 | Seely | 248/624 |
| 4,572,473 | | 2/1986 | Seely | 248/624 |
| 4,575,040 | * | 3/1986 | Seely | 248/624 |
| 4,592,158 | | 6/1986 | Seely | 40/603 |
| 4,619,220 | * | 10/1986 | Seely | 116/63 P |
| 5,725,186 | | 3/1998 | Hillstrom et al. | 248/176.1 |
| 6,082,680 | * | 7/2000 | Woodward et al. | 248/682 |

* cited by examiner

*Primary Examiner*—Anita M. King
*Assistant Examiner*—Holly N. Sy
(74) *Attorney, Agent, or Firm*—Harness, Dickey & Pierce, P.L.C.

(57) ABSTRACT

A sign attachment bracket assembly for holding and securing a sign panel on an upright member of a sign stand. The assembly includes a spring member having a tab extending through an aperture on the surface of the upright member. The tab is releasably positionable between a locked position and an unlocked position. A first bracket member is slidably mounted on the upright member and supported by the tab. The first bracket member includes a slot adapted to receive a horizontally oriented cross-brace of the sign assembly. A second bracket member is movable relative to the first bracket member and encloses the slot of the first bracket member, thereby securing the cross-brace in the slot.

15 Claims, 3 Drawing Sheets

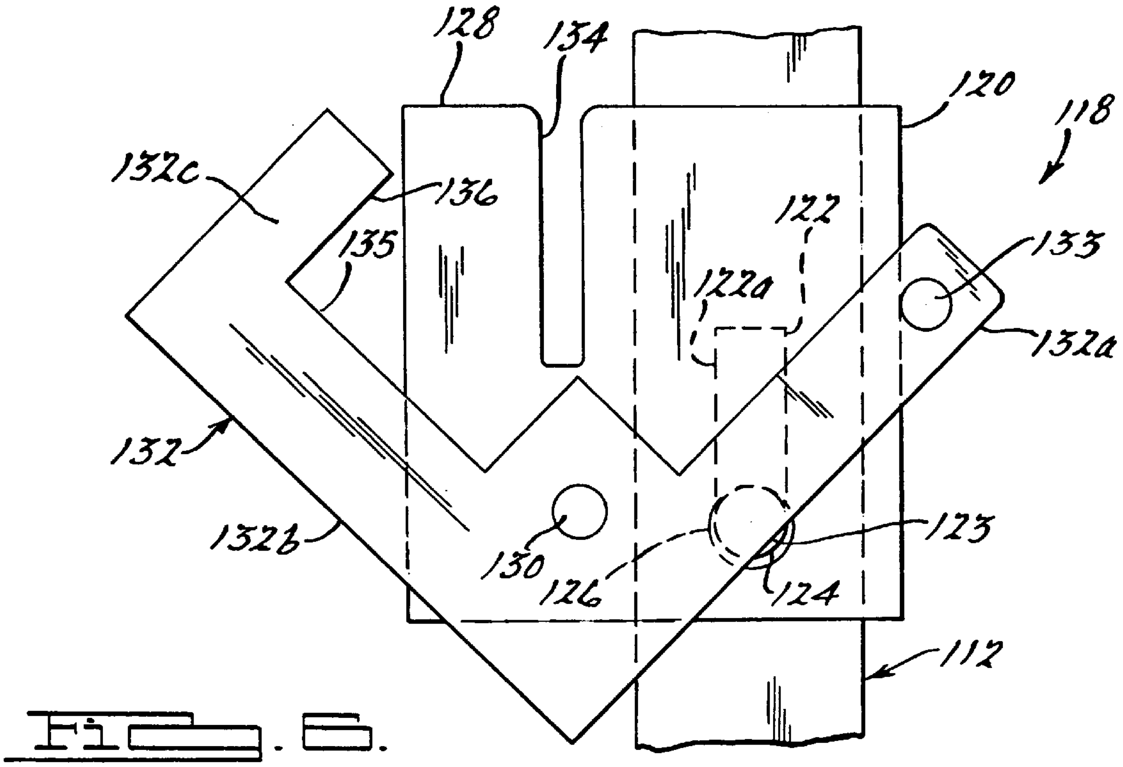
FIG. 6.
FIG. 7.
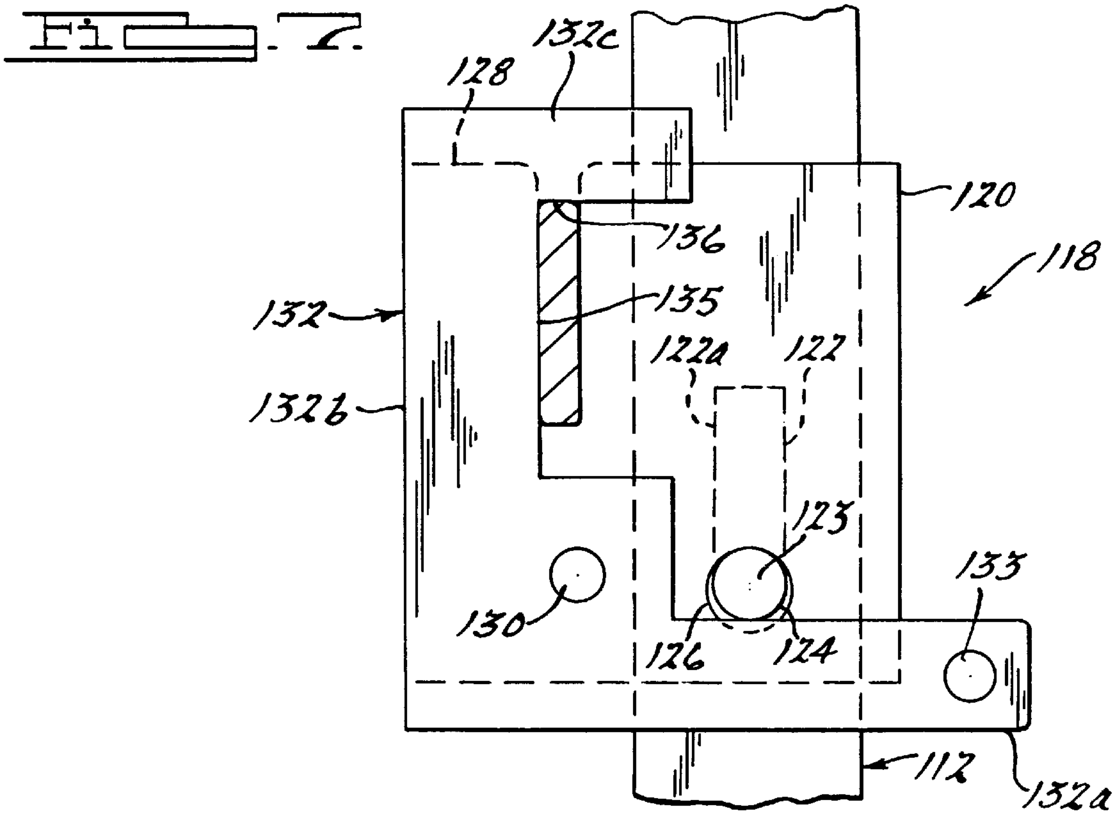

SIGN BRACKET FOR SIGN STAND

BACKGROUND OF THE INVENTION

1. Technical Field

The present invention relates generally to sign stands and other display devices, and more particularly to an improved apparatus for mounting a roll-up or flexible sign on a sign stand.

2. Discussion

Numerous sign stand devices have been designed for displaying advertisements and information to the public. On construction sites, for example, such signs are typically positioned on sign stands that are either anchored in the ground, held in place by sand bags or other heavy objects, or spring-mounted on bases which allow them to bend or deflect relative to the base without tipping over under high wind forces.

Signs commonly used at construction sites or at roadside emergency situations are square, rectangular, or diamond in shape, flat in configuration, made of metal or wood, and have pertinent informative or warning messages or symbols on them. These signs are bulky and heavy and as a result many problems are encountered in the storage, transportation, and mounting of them. In order to provide a lighter and more easily transportable display, signs have been developed which are made out of a heavy duty flexible and foldable material, such as vinyl or reinforced cloth or plastic which is retro-reflective. Such signs are lighter and easier to handle than the prior metal or wood signs and are also typically adapted to be rolled-up or folded-up for ease of transportation and storage.

The roll-up signs usually have one or more rigid cross-braces or support members to hold them in their fully extended configurations, with mounting means for mounting the sign to the support members and brackets or other mounting means thereon for holding the sign assemblies on their stands. The cross-braces or supporting members are typically elongated members made of wood, fiberglass or a similar strong material, and are connected to one another in the middle so that they can be rotated together to a generally aligned position for storage. Some of the brackets presently in use for mounting such signs to the sign stands, however, are often difficult and time-consuming to operate, thereby making them inconvenient for use in construction or emergency situations. Many of the brackets conventionally used are heavy and bulky.

In addition, because the sign stands are often used in roadside locations, they on occasion became involved in collisions with motor vehicles. Both state and federal agencies have instituted various motor vehicle safety standards to address this issue. Specifically, NCHR-350 is a recently enacted federal law that relates to crash performance of roadside sign stands. In view of the more stringent requirements of NCHR-350, improvements may be required in the sign stands in order for them to meet the standards as set thereby. In particular, conventional bracket designs currently in use may contribute to the poor performance of the sign stands during the tests because of their weight, size, and configuration.

Therefore, there is a need for an improved sign bracket for use on a sign stand device which is relatively light in weight, compact in size, economical to produce, and which can be made operational with relative ease and expediency.

SUMMARY OF THE INVENTION

It is therefore an object of the present invention to provide an improved sign attachment bracket for holding and securing a sign assembly on an upright member of a sign stand.

It is a further object to provide an improved sign attachment bracket that allows for quick and easy mounting or attachment of retro-reflective flexible signs on their support members and on the upright member of the sign stand.

It is still a further object of the present invention to provide a lightweight sign attachment bracket, thereby reducing the overall weight of the sign stand and lowering the center of gravity of the sign stand.

Accordingly, the present invention is directed to an improved sign attachment bracket arrangement for holding and securing a sign assembly on an upright member of a sign stand. The arrangement includes a spring member secured to the upright member and having a tab or button extending through an aperture on the surface of the upright member which is releasably positionable to establish one of a locking mode and an unlocking mode. The attachment bracket includes first bracket member which is slidably mounted on the upright member and positionably supported by the tab. The first bracket member includes a slot adapted to receive a horizontally-oriented cross-brace of the sign assembly. The second bracket member is movable relative to the first bracket member and has a latching member for enclosing the slot of the first bracket member, thereby securing the cross-brace in the slot. The first and second brackets can be formed of a lightweight and durable material, such as various formable engineered plastics. The configuration and lightweight nature of the bracket assembly allows for convenient set-up and reduces the overall weight of the sign stand in order to better accommodate federal motor vehicle safety standards.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 6 is a side view of the sign attachment bracket according to a second preferred embodiment of the present invention, wherein the sign attachment bracket is in an open mode or position; and FIG. 7 is a side view of the sign attachment bracket according to a second preferred embodiment of the present invention, wherein the sign attachment bracket is in a closed mode or position.

DETAILED DESCRIPTION OF THE PREFERRED EMBODIMENTS

As the drawings show merely exemplary embodiments of the present invention for purposes of illustration only, one skilled in the art will readily recognize that the principles of the invention are well adapted for application to other than sign and stand assemblies. Furthermore, one skilled in the art will readily appreciate that various adaptations of the preferred embodiments may be combined or otherwise modified without departing from the scope of the invention.

Figure 1:
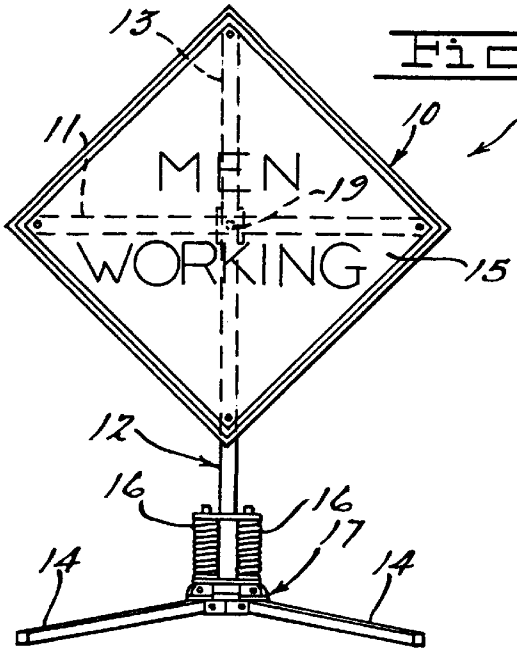
FIG. 1 is a front view of a portable sign stand having a sign attachment bracket according to principles of the present invention.
Figure 2:
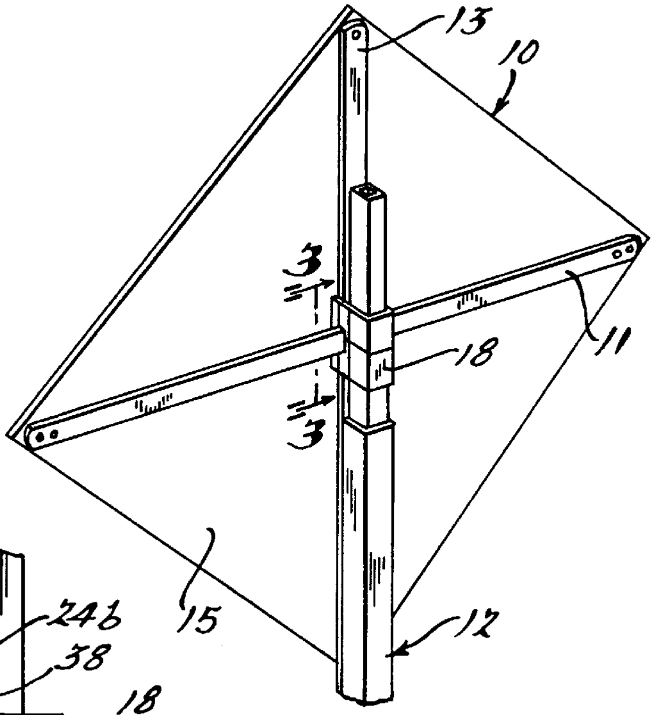
FIG. 2 is a partial rear perspective view of the sign stand shown in FIG. 1, depicting a preferred embodiment of a sign attachment bracket of the present invention.

FIGS. 1 and 2 show an inventive sign attachment bracket in use on a construction sign stand 8, with a construction sign 10 mounted on an upright 12. The upright 12 is supported on the ground preferably by a plurality of ground engaging legs 14 and a pair of coil springs 16 which allow the sign 10 and upright 12 to deflect relative to the base assembly 17 in a downward direction when subjected to external forces such as wind, and then resiliently return to the normal upright position shown in FIG. 1. It is understood, of course, that the sign attachment bracket of the present invention may also be used with other types of sign stands or frame members, whether permanently anchored or portable.

The upright 12 may be composed of any conventional material which is sturdy enough to be used for the purpose described herein, but is preferably composed of a tubular construction, such as aluminum or steel. The cross-sectional shape of the upright 12 is preferably square (as shown in FIGS. 2 through 7), although it should be understood that the upright 12 can have any suitable cross-sectional size and shape so long as it can be used as a stand for a construction sign or similar display.

The sign 10 has a large flexible and foldable sign panel 15 typically having a warning, message or symbol on one side and a pair of cross-braces 11 and 13 pivotally attached to one another on the other side by a rivet 19 or some other suitable pivoting means. The flexible sign panel 15 is preferably composed of a heavy-duty material such as vinyl or reinforced cloth or plastic, for example. The cross-braces 11 and 13 are made of a relatively rigid material (such as fiberglass, metal, or wood) and serve to brace and support the flexible sign panel 15 in its fully extended position. As shown in FIG. 2, one of the cross-braces 11 is pivoted to a horizontal position when the sign is mounted to the upright 12, while the other cross-brace 13 is vertically situated. Any of the attaching means known in the art may be used to retain the corners of the sign panel at the ends of the cross-braces 11 and 13 in order to erect the sign to its display configuration. A presently preferred configuration is the Duralatch® attachment system manufactured by Marketing Displays International, Inc. of Farmington Hills, Mich. When the sign 10 is removed from the upright 12 and is to be taken down, at least two corners of the flexible sign panel material are detached from the other ends of their corresponding cross-brace, and the cross-braces are pivoted to a generally parallel, mutually aligned relationship. The flexible sign panel 15 which remains attached to one of the cross-braces, may then be folded or rolled up around the mutually-aligned cross-braces for compact, convenient storage.

Figure 3:
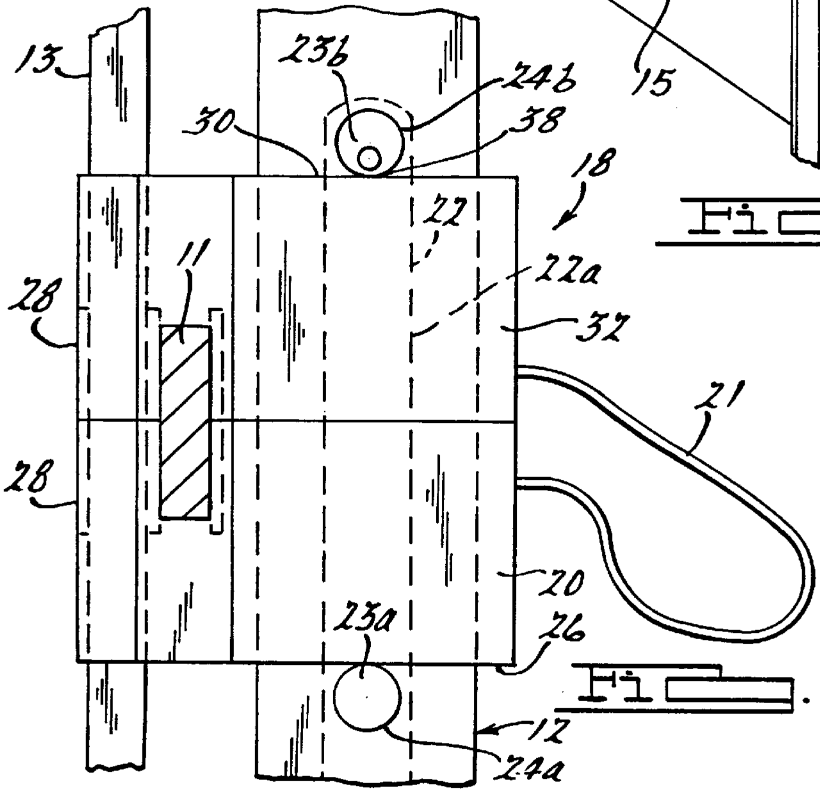
FIG. 3 is a side view illustrating a first preferred embodiment of the sign attachment bracket, wherein the sign attachment bracket is in a closed mode or position.
Figure 4:
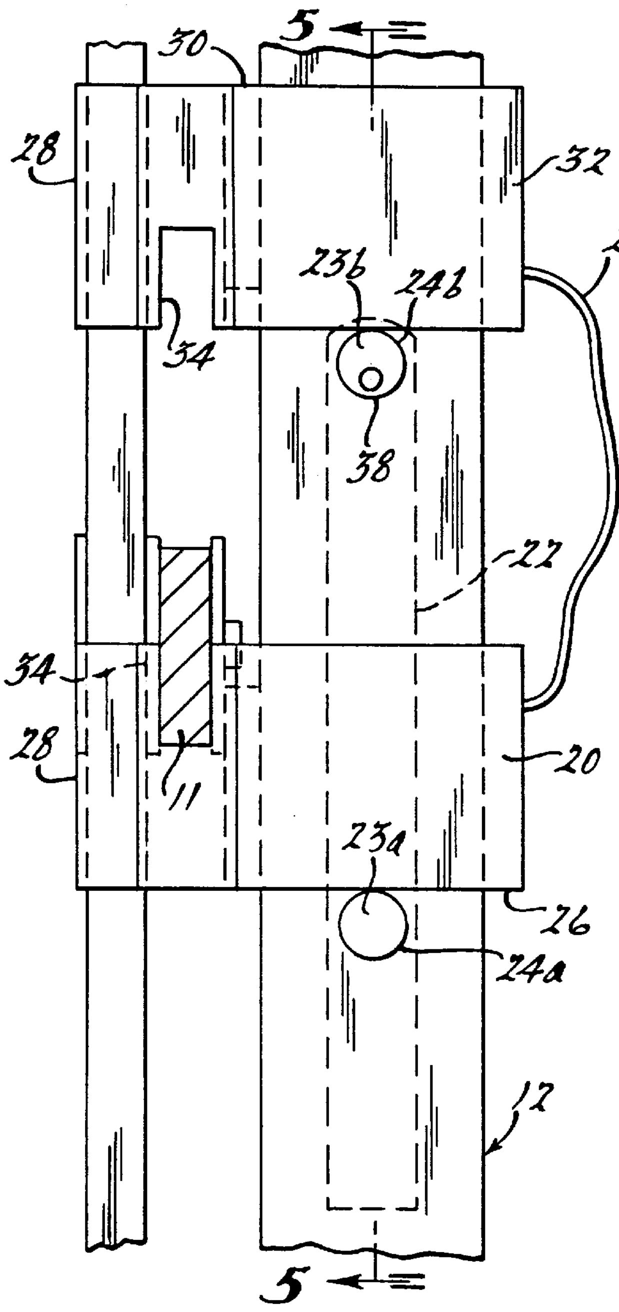
FIG. 4 is a side view illustrating the preferred embodiment of the sign attachment bracket as shown in FIG. 3, but depicting the sign attachment bracket in an open mode or position.
Figure 5:
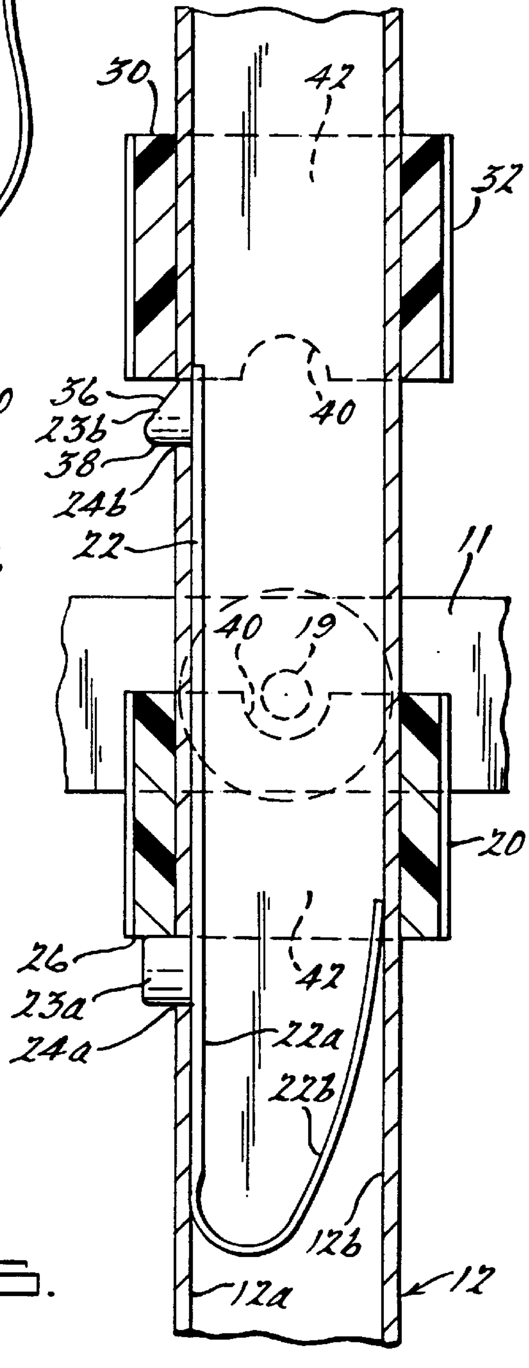
FIG. 5 is a cross-sectional view of the sign attachment bracket as shown in FIG. 4.

In accordance with the present invention, the sign 10 is held in place on the upright 12 of the sign stand 8 by a sign attachment bracket 18. FIGS. 3–5 illustrate a first preferred embodiment of the sign attachment bracket 18. The bracket 18 preferably includes a first bracket portion 20 that is adapted to surround and slidably engage the upright 12. The cross-sectional size and shape of the first bracket portion 20 should preferably correspond to the cross-sectional size and shape of the upright 12.

Positioned inside the upright 12 is a J-shaped spring member 22 having a leg portion **22*a* lying substantially flat against an inner wall 12*a* of the upright 12 and a hook portion 22*b* traversing the cross-section of the upright 12 and engaging an opposite wall 12*b* of the upright 12. A lower locating button or tab 23*a* is formed on the leg portion 22*a* of the spring member 22 adjacent the hook portion 22*b* and extends through an aligned aperture 24*a* formed in the upright 12. An upper locking button or tab 23*b* is formed on the end of leg portion 22*a* of the spring member 22 opposite the hook portion 22*b* and extends through an aligned aperture 24*b* formed in the upright 12. The walls of the hollow upright 12 constrain the spring member 22 such that it is releasably positioned in upright 12, whereby the leg portion 22*a* functions as a leaf spring to bias the lower tab 23*a* into an extended position and leg portion 22*a* functions as a cantilever spring to bias the upper tab 23*b* into an extended position. The lower locating tab 23*a* abuts the bottom edge 26 of the first bracket portion 20 in order to support the sign attachment bracket 18 at the desired vertical height of the upright 12**.

The upper locking tab **23*b* may be depressed to allow a second bracket portion 32 to slide over it and mate with the first bracket portion 20. The upper locking tab 23*b* is inserted through an aligned aperture 24*b* in the upper section of upright 12 to provide a locked position for the second portion 32. The spring member 22 is loaded such that it resiliently urges the upper locking tab 23*b* outward through the aperture 24*b*. As best seen in FIG. 7, the upper locking tab 23*b* has a tapered face 36 which slopes toward the upright 12 in a direction away from the lower locating tab 23*a* to provide a camming surface which is sloped downwardly to allow the first and second bracket portions 20, 32 to slide downwardly into the appropriate location on the upright 12 without manual manipulation of the upper locking tab 23*b*. The bottom face 38 of the upper locking tab 23*b* is shaped to provide a surface which abuts the upper edge 30 of the second bracket portion 32 to prevent undesired upward movement of each bracket portion 20 and 32**.

In order to secure the first bracket portion 20 of the sign attachment bracket 18 onto the upright 12, the first bracket portion 20 is slid axially downwardly on the upright 12 until it engages the upper locking tab **23*b*. Upper locking tab 23*b* is urged inwardly as the bottom edge 26 of the first bracket portion 20 engages the camming surface 36 of upper locking tab 23*b*. The first bracket portion 20 can then slide over the upper locking tab 23*b* against the force of the spring member 22. Once first bracket portion 20 has slid past it, the upper locking tab 23*b* can "snap" outwardly under the force of the spring member 22. The lower locating tab 23*a* provides an abutment which resists further downward movement of the first bracket portion 20, thereby positioning it at the desired vertical height on the upright 12. Similarly, the second bracket portion 32 is slid axially downwardly on the upright 12**.

In order to completely remove the sign attachment bracket 18 from the frame 12, the upper locking tab **23*b* must be depressed into a retracted position such that it becomes flush with the surface of the upright 12. The first bracket portion 20 and second bracket portion 32 may then slide over the upper locking tab 23*b* against the force of the spring member 22. Once each bracket portion 20 and 32 has slid clear of the upper locking tab 23***b*, the upper locking tab 23*b* can snap outwardly under the force of the spring member 22. A tether 21 may be used to loosely interconnect first bracket portion 20 and second bracket portion 32 such that they do not become separated once removed from the upright 12.

As is illustrated in FIGS. 3 and 4, both the first bracket portion 20 and the second bracket portion 32 include a pair of outwardly extending flanges 28, having slots 34 which are laterally aligned with each other such that the horizontal cross-brace 11 may be positioned in the slots 34 in order to mount the sign 10 on the sign attachment bracket 18.

The second bracket portion 32 can be slidably adjusted to abut the first bracket portion 20 such that the flanges 28 and slots 34 form an open state, as seen in FIG. 4, or a closed state, as seen in FIG. 3. In such closed position, the flanges 28 capture and secure the horizontal cross-brace 11 in slots 34. In the closed position, the tabs 23*a*, 23*b* are in an extended position to prevent the axial movement of the first bracket portion 20 and second bracket portion 32 along the upright 12. By such a relationship, the flanges 28 prevent the cross-brace 11 from being lifted or otherwise moved upwardly, under the influence of wind gusts, for example, and thus escaping from the channel slots 34.

The sign attachment bracket 18 facilitates quick and easy removal of the sign 10 from the sign stand 8. In order to attach the sign 10 to the sign attachment bracket 18, the second bracket portion 32 is in the open position, as seen in FIG. 4. The cross-brace 11 is then merely inserted or positioned in the slots 34 of the first bracket portion 20. The second bracket portion 32 is then manually slid over the upper locking tab 23*b* so that the slots 34 create an enclosure for the cross-brace 11, as best seen in FIG. 3.

To remove the sign 10 from the sign attachment bracket 18, the upper locking tab 23*b* is depressed and the second bracket portion 32 is slid upwardly away from first bracket portion 20 into the open position. The cross-brace 11 may then be lifted out of the slot 34 of the first bracket portion 20.

As best seen in FIG. 5, the first bracket portion 20 and the second bracket portion 32 each preferably include arcuate cutouts 40 formed in the side wall 42 such that when in the closed position, the combination of each arcuate cutout forms a clearance aperture to accommodate the rivet 19 of other configurations of the cross-braces 11 and 13.

As presently illustrated, first and second bracket portions 20, 32 are located in adjacent abutting alignment when located in the closed position. However, the second bracket portion may optionally include a skirt portion extending downwardly from a bottom edge. The skirt portion encompasses a top edge of the first bracket portion when in the closed position, thereby releasably interconnecting the first and second bracket portions and securing the horizontal cross-brace in the flanges.

With reference now to FIGS. 6 and 7, a second preferred embodiment of the sign attachment bracket 118 according to the principles of the present invention is illustrated in which components that are similar to those described with reference to the first preferred embodiment are annotated with similar reference numerals incremented by 100.

Sign attachment bracket 118 includes a first U-shaped bracket portion 120 that is adapted to surround and slidably engage three corresponding sides the upright 112. The cross-sectional size and shape of the first bracket portion 120 should preferably correspond to the cross-sectional size and shape of the upright 112.

Positioned inside the upright 112 is a U-shaped spring member 122 having a locating tab or button 123 formed on a leg portion 122*a* and extending through an aligned aperture 124 formed in the upright. The leg portion 122*a* lies substantially flat against an inner wall of the upright 112 and a hook portion (not shown) traverses the cross-section of the upright 112 and engages an opposite wall thereof. In this manner, spring member 122 is similar to spring member 22 except that the length of the leg portion 122*a* may be approximately equal to the length of the hook portion such that the spring member 122 is U-shaped rather than J-shaped. The walls of the hollow upright 112 constrain the spring member 122, thereby allowing it to function as a cantilever spring to bias the locating tab 123 into an extended position through an aligned aperture 124 in the upper section of upright 112 and through an aperture 126 in the first bracket portion 120 in order to appropriately position and support the sign attachment bracket 118 at the desired vertical height on the upright 112.

In order to secure the sign attachment bracket 118 onto the upright 112, the locating tab 123 is depressed such that it becomes flush with the surface of the upright 112. The first bracket portion 120 can then slide downwardly over the locating tab 123 against the force of the spring member 122. Once the apertures 124 and 126 are aligned, the locating tab 123 can snap outwardly under the force of the spring member 122 to engage the apertures 124 and 126 and support the sign attachment bracket 118.

Similarly, to remove the sign attachment bracket 118 from the upright 112, the locating tab 123 must be depressed into a retracted position such that it becomes flush with the surface of the upright 112. The first bracket portion 120 can then slide upwardly over the locating tab 123 against the force of the spring member 122. Once the first portion has slid clear of the locating tab 123, the locating tab 123 can snap outwardly under the force of the spring member 122.

As is illustrated in FIGS. 6 and 7, the first bracket portion 120 includes a pair of outwardly extending legs or flanges 128, having slots 134 which are laterally aligned with each other such that the horizontal cross-brace 11 (not shown) may be positioned in the slots 134 in order to mount the sign 10 on the sign attachment bracket 118.

A pivot pin 130, which interconnects each side of the first U-shaped portion 120 to provide a surface which abuts the upright 112, works in association with the locating tab 123 to locate the sign attachment bracket 118 to the upright 112. The pivot pin 130 extends through apertures in the first bracket portion 120 and in a second bracket portion 132. In this manner, the pivot pin 130 allows the second bracket portion 132 to rotate relative to the first bracket portion 120.

The second bracket member 132 is generally L-shaped having a handle portion 132*a* and a base portion 132*b*. Second bracket portion 132 includes a left hand side and a right hand side which are mirror images of one another, it being understood that FIGS. 6 and 7 only illustrate one side thereof. Pin 133 interconnects the handle portions 132*a* of the left and right hand sides of the second bracket member and functions as a stop for limiting the rotation of the second bracket member in the open position. A relief 135 formed in the base portion 132*b* is complementary to the slots 134 formed in the first bracket member 120 and defines a latch 132*c* which cooperates with the slots 134 to form an open position, as seen in FIG. 6, or a closed position, as seen in FIG. 7. In such closed position, the latch 132*c* covers the open end of slots 134 to capture and retain the horizontal cross-brace 11 in the sign bracket assembly.

It should be noted that when the second bracket portion 132 is in the closed state, the lower edges 136 formed by relief 135 are disposed above the upper edge of the cross-brace 11. By such a relationship, the second bracket portion 132 captures the cross-brace 11 and prevents it from being lifted or otherwise moved upwardly, under the influence of wind gusts, for example, and thus escaping from the slots 134.

The sign attachment bracket 118 facilitates quick and easy removal of the sign 10 from the sign stand 8. In order to attach the sign 10 to the sign attachment bracket 118, the second bracket portion 132 is moved to the open position, as seen in FIG. 6. The cross-brace 11 is then merely inserted or positioned in the slots 134. The second bracket portion 132 may then be manually pivoted upwardly around the pivot pin 130 so that it captures the cross-brace 11, as best seen in FIG. 4. Once in the fully closed position, the locating tab 123 engages an upper edge of the handle portion 132*a* of second bracket portion 132 to prevent counter-rotation towards the open position.

To remove the sign 10 from the sign attachment bracket 118, the locking tab 123 is pushed inwardly into a retracted position and the second bracket portion 132 is manually pivoted downwardly around the pivot pin 130. The cross-brace 11 may then be lifted out of the slots 134.

The first and second bracket portions of each preferred embodiment are preferably made of an engineered plastic material, or any suitable material which is strong enough to withstand the forces that sign stands are normally exposed to in use. The first and second bracket portions may be formed by an injection molding or thermoforming process. The spring member is preferably made of spring steel, or some other suitable material that is elastically deformable and provides sufficient stiffness to urge the respective tabs through the respective aperture in the upright. Although the bracket of this preferred embodiment of the invention is described above as being used for flexible or roll-up type signs of diamond shape, it is apparent that the bracket can be used with a wide variety of signs of different materials, rigid or soft, and with signs of widely varying shapes and sizes. With rigid signs, a flange or attachment bar adapted to fit within the channel spaces or slots 134 could be incorporated onto the back side of the sign panel.

From the foregoing description of the preferred embodiments, it will be readily apparent that certain variations, modifications, or alterations may be made therein. Such variations are not to be regarded as a departure from the spirit and scope of the invention.

What is claimed is:

1. A sign stand comprising:

an upright;

a locator extending from said upright;

a locking member extending from said upright; and a sign bracket assembly including a first member having a first flange extending outwardly from said upright, and a second member having a second flange extending outwardly from said upright, at least one of said first flange and said second flange having a slot formed therein for receiving a sign crossbar;

said second member being axially slidable along said upright between an open position wherein access is provided to said slot and a closed position wherein said second member engages said first member and said locking member engages said second member such that said locator and said locking member fixedly position said sign bracket assembly to said upright.

2. The sign stand of claim 1 further comprising:

a tubular upright having a first aperture formed therethrough; and a spring member disposed within an interior of said tubular upright, said spring member having a first leg engaging an interior wall of said tubular upright and a second leg, said locking member being formed on said second leg and resiliently positionable within said first aperture between an extended position and a retracted position to permit axially positioning of said second member.

3. The sign stand of claim 2 wherein said locking member has a tapered face which slopes towards said upright in a direction away from said locator to provide a camming surface.

4. The sign stand of claim 2 wherein said tubular upright has a second aperture formed therethrough, said locator being formed on said second leg and extending through said second aperture.

5. The sign stand of claim 1 further comprising:

a tubular upright having a first aperture and a second aperture formed therethrough; and a spring member disposed within an interior of said tubular upright, said spring member having a first leg engaging an interior wall of said tubular upright and a second leg, said locking member being formed on said second leg and resiliently positionable within said first aperture between an extended position and a retracted position to permit axially positioning of said second member, said locator being formed on said second leg and extending through said second aperture.

6. The sign stand of claim 5 wherein said spring member is a J-shaped spring having a hook portion and a leg portion, said locking member formed on an end of said leg portion opposite from said hook portion, and said locator being formed on said leg portion adjacent said hook portion.

7. The sign stand of claim 5 wherein said locking member has a tapered face which slopes towards said upright in a direction away from said locator to provide a camming surface.

8. The sign stand of claim 1 wherein said first flange and said second flange each has the slot formed therein which are aligned for receiving the crossbar.

9. The sign stand of claim 1 wherein said second member of said sign bracket assembly includes a wall portion surrounding said upright, said second flange extending outwardly from said wall portion.

10. The sign stand of claim 9 wherein said wall portion has a cutout formed therein adjacent said second flange.

11. The sign stand of claim 9 wherein said first member of said sign stand bracket assembly includes a wall portion surrounding said upright, said first flange extending outwardly from said wall portion.

12. The sign stand of claim 11 wherein at least one of said wall portions of said first member and said second member has a cutout formed therein adjacent said first flange and said second flange.

13. The sign stand of claim 11 wherein said wall portions of said first member and said second member has a cutout formed therein adjacent said first flange and said second flange.

14. A sign stand comprising:

a tubular upright having an upper aperture and a lower aperture formed therethrough;

a spring member disposed within an interior of said tubular upright, said spring member having a hook portion engaging an interior wall of said tubular upright and a leg portion;

a locator formed on said leg portion adjacent said hook portion and extending through said lower aperture of said upright;

a locking member formed on said leg portion at an end opposite said hook portion and extending through said upper aperture, said locking member resiliently positionable within said upper aperture;

a sign bracket assembly including a first member having a first wall portion surrounding said upright and a first flange extending outwardly from said first wall portion and having a first slot formed therein, and a second member having a second wall portion surrounding said upright and a second flange extending outwardly from said second wall portion and having a second slot formed therein, said second member being axially slidable along said upright and engagable with said first member;

said second member being axially positionable between an open position wherein access is provided to said first slot and a closed position wherein said second member engages said first member and said locking member engages said second member such that said locator and said locking member fixedly position said sign bracket assembly to said upright.

15. The sign stand of claim 12 wherein said locking member has a tapered face which slopes towards said upright in a direction away from said locator to provide a camming surface.

* * * * *